July 5, 1966  C. G. SANFORD  3,259,390
HYDRAULIC BALANCED SELF-ALIGNING SHAFT SEAL
Filed June 17, 1963  3 Sheets-Sheet 1
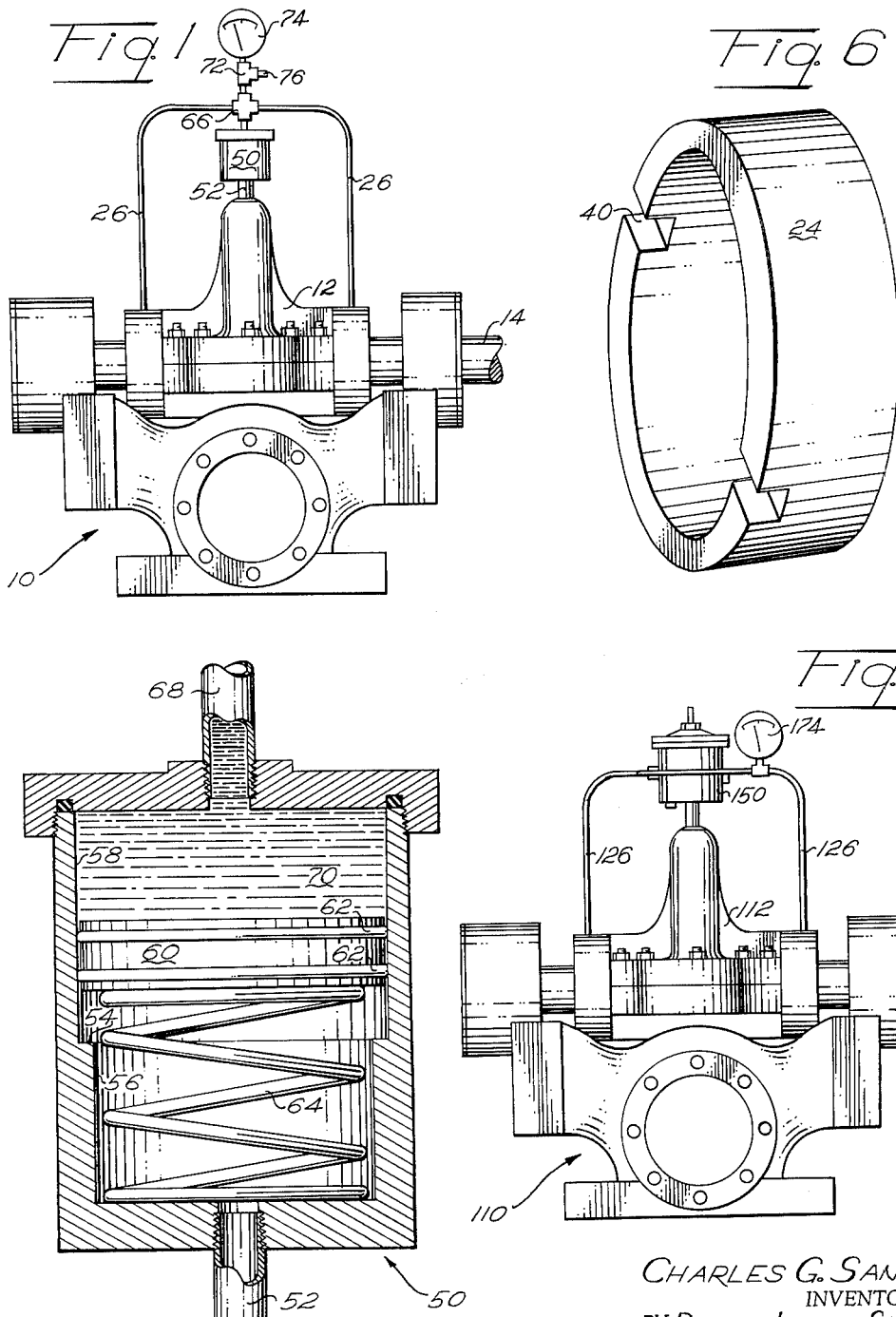
CHARLES G. SANFORD
INVENTOR.
BY DOROTHY LUCILLE SANFORD
EXECUTRIX
BY C. W. Coffee
Atty.

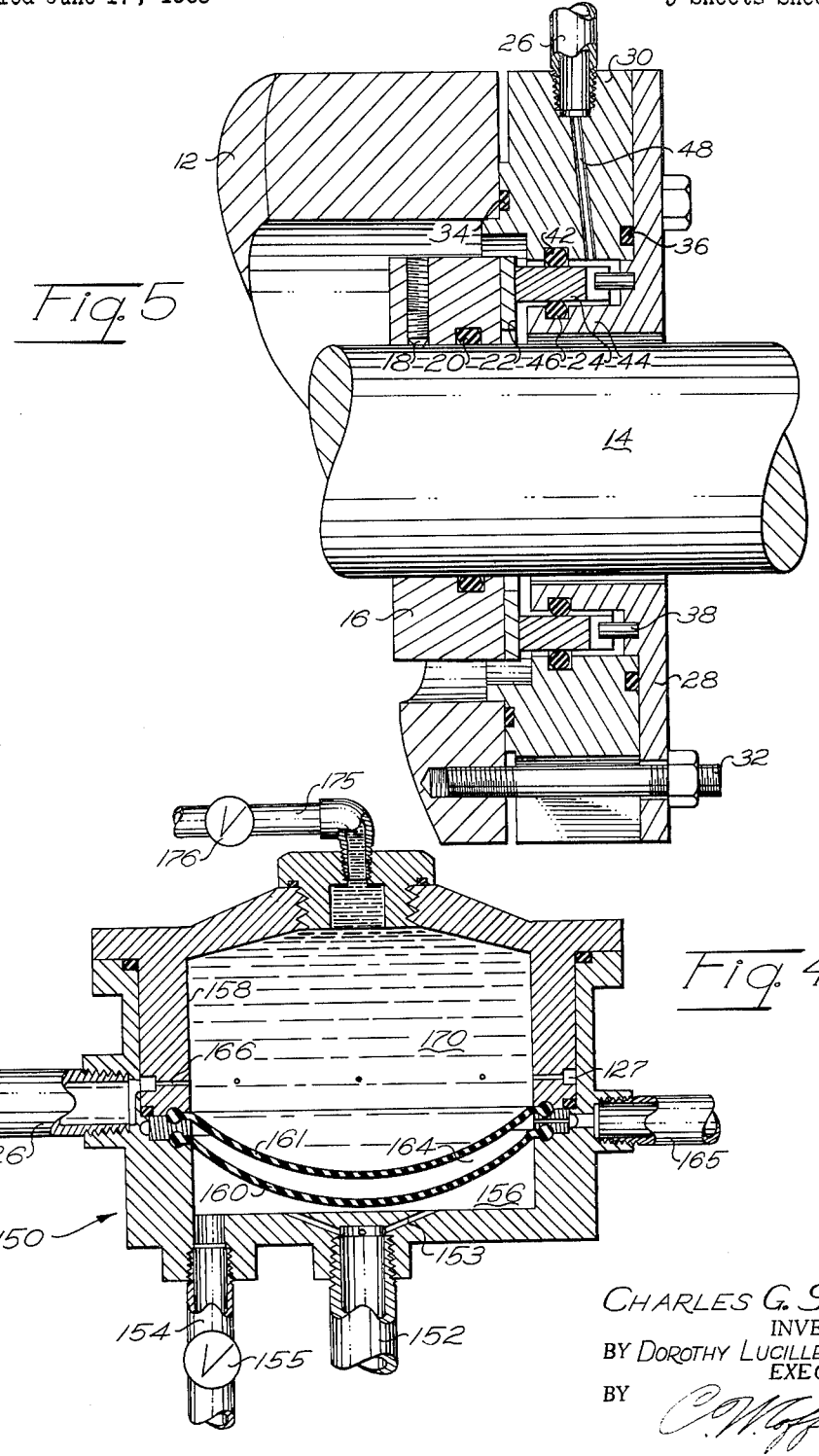

July 5, 1966   C. G. SANFORD   3,259,390
HYDRAULIC BALANCED SELF-ALIGNING SHAFT SEAL
Filed June 17, 1963   3 Sheets-Sheet 3

CHARLES G. SANFORD
INVENTOR.
BY DOROTHY LUCILLE SANFORD
EXECUTRIX
BY
Atty.

United States Patent Office 3,259,390
Patented July 5, 1966

3,259,390
HYDRAULIC BALANCED SELF-ALIGNING
SHAFT SEAL
Charles G. Sanford, deceased, late of Odessa, Tex., by
Dorothy Lucille Sanford, executrix, Odessa, Tex., assignor to Dorothy L. Sanford
Filed June 17, 1963, Ser. No. 288,561
2 Claims. (Cl. 277—3)

This invention relates to sealing a rotating shaft to a housing and more particularly to the type of seal known as a balanced radial seal.

More particularly this is the type of seal wherein a sealing washer is pressed against a radial sealing surface of a collar which is mounted to a rotating shaft. The washer is pressed against the collar by a hydraulic force and the hydraulic force is obtained from the source of pressure within the housing so that the force the seal is pressed against the surface increases as the pressure within the housing sealed against increases.

Often these seals will leak because impurities get within this running joint of the washer seals against the surface. This problem is solved by this invention by releasing the pressure by which the washer is pushed against the seal sufficiently to allow the fluid within the housing to flush the sealing surface to wash away the impurities. Afterwards the seal may be reseated by additional pressure and operation continued. Inasmuch as this hydraulic force is from an outside source it does not necessarily need to be directly related to the pressure within the housing. I.e. if it is considered to be desirable, a much higher and greater pressure may be used so that the seal may be sealed with a greater pressure to make it hold under certain adverse conditions.

There is a problem of maintaining alignment in a seal of this type and any mounting for the seal wherein it becomes partially or wholly self-aligning is desirable. Self-alignment is accomplished by supporting the seal on a single diametrical plane. I.e. the supports on both sides of the seal on the interior periphery and the exterior periphery are both single line contact lying in the same plane. This allows the seal to make slight angular adjustment.

An object of this invention is to provide a superior seal for rotating shafts within housings.

Another object of this invention is to provide means for varying the pressure by which the washer is pressed against the sealing surface.

Another object is to provide means for reducing the force by which the sealing washer is pressed against the sealing surface so that the sealing area may be flushed to remove impurities.

Another object is to provide a sealing joint which is self-aligning and has a great deal of flexibility.

A further object is to have a minimum of rotating parts attached to the shaft to balance.

Still further objects are to achieve the above with a device that is sturdy, compact, durable, simple, reliable, and versatile, yet inexpensive and easy to manufacture and operate.

The specific nature of the invention as well as other objects, uses, and advantages thereof will clearly appear from the following description and from the accompanying drawing, the different views of which are not necessarily to the same scale, in which:

FIG. 1 is an elevational view showing the general arrangement of parts of one embodiment of this invention.

FIG. 2 is a sectional view of one form of an isolation cylinder suh as is shown in FIG. 1.

FIG. 3 is an elevational view of the general arrangement of a modified form of this invention.

FIG. 4 is a sectional view of a modified type of isolation cylinder.

FIG. 5 is a sectional view showing one seal according to this invention.

FIG. 6 is a perspective view of the sealing washer as would be used in the embodiment as seen in FIG. 5.

Figure 8:
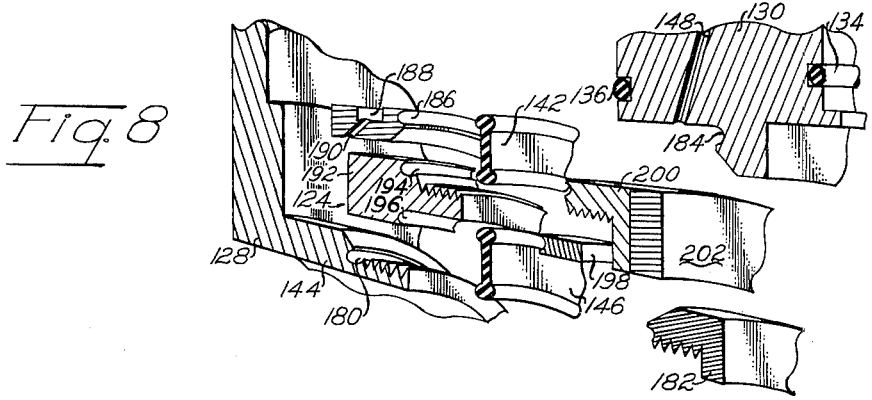
FIG. 8 is an exploded partial sectional perspective view specifically illustrating the way the sealing washer is connected by diaphragms to the housing in the embodiment of FIG. 7.

As may be seen more particularly in FIG. 1 of the drawings, this invention is illustrated as being attached to pump 10 having a housing 12. The pump is driven by shaft 14. It is the object of this invention to provide an effective seal to prevent leakage from the joint between the housing 12 and the rotating shaft 14.

Referring to FIG. 5, it will be seen that collar 16 is attached to the shaft 14 by set screw 18. It will be understood that the set screw is meant to be only representative of means for attaching the collar 16 to the shaft 14 and that there are many other ways in which this could be done, all well-known in the art. O-rings 20 are within a groove in the collar 16 and provide a seal to the shaft 14 also as is well-known to the art. Radial sealing surface 22 is provided on one surface of the collar 16. As illustrated this radial sealing surface 22 is a special material which is attached to the collar 16. Such special material and techniques for attaching them to the collar 16 are well-known.

Annular sealing washer 24 is forced against the surface 22 to form a fluid-tight running joint. This joint between the washer 24 and radial sealing surface 22 of collar 16 will be referred to as the seal inasmuch as this is what prevents the fluid within the housing 12 from escaping around the rotating shaft 14. The washer 24 is made of special material well-known to the art often referred to as carbon, although it is not pure carbon and may be or may not contain carbon as a constituent. The sealing washer 24 is pressed against the sealing surface 22 by hydraulic pressure conveyed to the area by conduit 26. The washer 24 forms an annular piston which is located within an annular cylinder. The cylinder is formed by surfaces of end plate 28 and mounting ring 30 which are considered a part of housing 12. Bolts or studs 32 extend through the end plate 28 and mounting ring 30 to hold these elements to the remainder of the housing 12. The bolts or studs 32 extend into tapped holes of the housing 12. The mounting ring 30 is sealed to the housing 12 by any convenient, conventional means such as O-rings 34. Likewise the end plate is sealed to the mounting ring by O-rings 36. Lug 38 from end plate 28 extends into notch 40 of the sealing washer 24 (FIG. 6) to prevent rotation of the sealing washer. The mounting ring 30 has an annular groove on an interior cylindrical surface thereof which contains O-ring 42. The end plate 28 has an inwardly extending circumferential flange 44. On the exterior cylindrical surface thereof there is an annular groove containing O-ring 46. As may be seen, particularly referring to FIG. 5, the O-rings 42 and 46 lie in the same diametrical plane, therefore permitting the sealing washer 24 certain freedom of movement. I.e. the sealing washer 24 does not necessarily have an exact fixed axis. If the axis of rotation of the shaft 14 should shift slightly so that it angles with respect to what is shown, the axis of the sealing washer 24 could shift also to accommodate this slight movement.

The conduit 26 is connected into a tapped hole within the mounting ring 30 and a hole 48 extends from the conduit 26 to the annular cylindrical area behind the washer 24. Therefore, the force pressing the sealing washer 24, which is in the form of an annular piston, is determined by the pressure within the conduit 26.

Referring back to FIGS. 1 and 2, the conduit 26 derives its pressure from isolation cylinder 50, which is connected into the housing 12 of the pump 10 by tube 52. The cylinder 50 has an internal bore which is divided by shoulder 54 into a bore of smaller diameter 56 and a bore of larger diameter 58. The larger diameter bore 58 is above the smaller diameter bore 56 and the tube 52 opens into the bore 56 of smaller diameter. Piston 60 is fitted within the bore 58 of larger diameter and forms a fluid-tight seal there with convention rings 62 which in this instance are in the form of O-rings. Compression spring 64 extends within the smaller bore 56 between the bottom of the cylinder 50 and the piston 60. Cross 66 is attached to the top of the isolation cylinder 50 by tube 68. The two conduits 26 attach to the cross 66, one conduit 26 extending to the seal on each side of the pump 10. The tube 68 is in fluid communication with the larger bore 58. If there is no pressure in the housing 12, there still will be pressure maintained on hydraulic fluid 70 in conduit 26 and bore 58 which is that pressure exerted by the compression spring 64. Therefore, if the pumps are rotating but do not produce pressure therein, there will still be hydraulic pressure in the conduits 26 pressing the sealing washer 24 against the sealing surface 22. T 72 is connected to the fourth opening of cross 66. Gauge 74 is attached to one opening in the T 72 and valve 76 is connected to the other.

Therefore, if it is desired to release all the pressure within the conduit 26 this may be done by opening the valve 76 and bleeding hydraulic fluid 70 from the system. When the piston 60 reaches the top of the cylinder 50 obviously no more pressure is exerted by the spring 64 against the hydraulic fluid 70 and therefore the force by which the sealing washer 24 is pressed against the sealing surface 22 is practically non-existent. This will permit the pressure of the fluid within the housing 12 to force the sealing washer 24 from the surface 22 permitting the flushing action discussed above. By suitable connections (such as a grease gun), additional hydraulic fluid may be introduced into the conduits 26 through the valve 76. Of course, as additional fluid is introduced the piston 60 will move down from the top of cylinder 50 so that the pressure in the conduit 26 is equal to the pressure in the housing 12 plus the pressure resulting from the spring 64. If the seal leaks with this pressure, it will be possible to force the seal against the surface 22 with even higher pressure by forcing additional fluid into the system through the valve 76, until piston 60 rests against the shoulder 54.

Therefore, a system is provided which is remarkably versatile in that the force by which the sealing washers 24 are pressed against the surface 22 may be reduced to flush the seal, may be maintained at a slightly higher pressure than the fluid within the housing 12 for normal operation, or may be maintained at a higher pressure manually by the introduction of additional hydraulic fluid 70 through valve 76. Of course, the pressure upon the seal at any time may be read directly upon the gauge 74.

Figure 7:
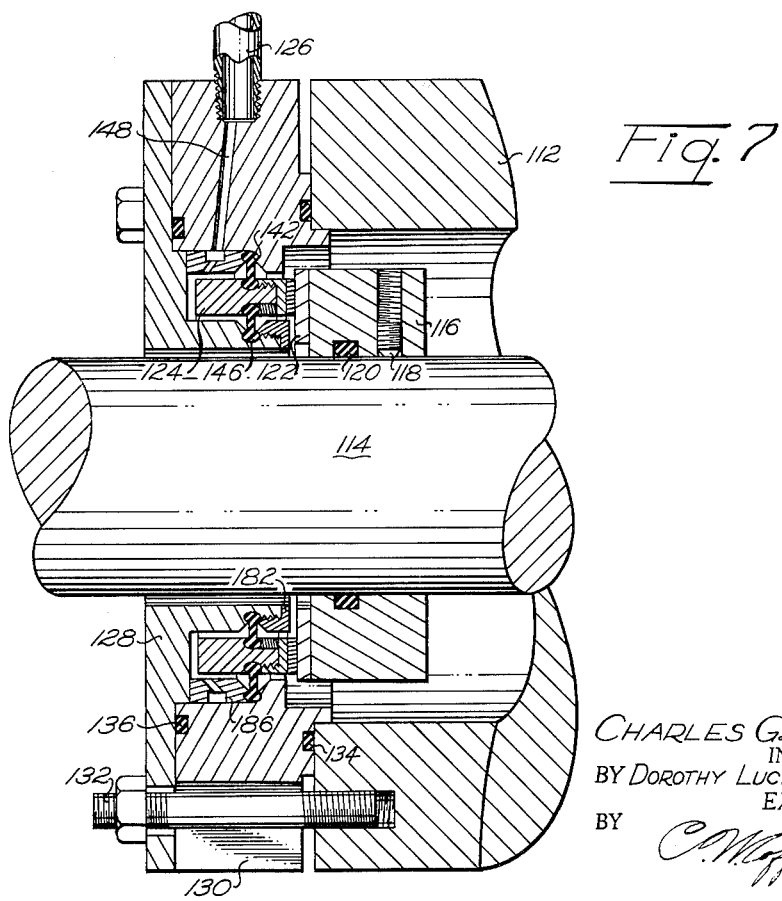
FIG. 7 is a sectional view of a modified form of a seal according to this invention.

FIG. 3 shows the general arrangement of a second embodiment. This second embodiment also is adapted to be used on pump 110 which has housing 112 and rotating shaft 114. Likewise it has an isolation cylinder 150. It will be understood that although a different type seal is used, which is shown in FIGS. 7 and 8, that a system with an isolation cylinder 150 could be used with the seals illustrated in FIG. 5. The isolation cylinder 150 is connected to the housing 112 by the tube 152 (FIG. 4). This tube 152 is connected by ports 153 of small diameter and communicates with a lower chamber 156. Conduits 126 lead from the isolation cylinder 150 to the seals. The conduits 126 are connected into the cylinder 150 and communicate with an annular space 127 by which it is connected by ports 166 into upper chamber 158. The ports 166 are of small diameter. Diaphragm 160 isolates the lower chamber 156 from static chamber 164. Diaphragm 161 isolates the static chamber 164 from the upper chamber 158. The pressure within the chamber 164 may be changed by fluid entering or leaving through conduit 165 which is connected to the walls of the cylinder 150. Gauge 174 in the conduit 126 indicates the pressure by which the seals are pressed against the sealing surface. Conduit 175 enters into the upper chamber 158 and has valve 176 therein. Likewise a conduit 154 leads from the lower chamber 156 and has valve 155 therein.

The operation of the isolation cylinder 150 is explained as follows: If there is no pressure entering through tube 152 yet pressure may be maintained upon hydraulic fluid 170 which is within the upper chamber 158 and the conduits 126. However, the pressure in such a case upon the hydraulic fluid 170 would be determined by the pressure within the static chamber 164. In fact, even if there is pressure in one tube 152 but this pressure is less than the static pressure in chamber 164, the pressure on hydraulic fluid 170 will be equal to the static pressure. In short, in this embodiment the pressure on the hydraulic fluid 170 will be equal to the greater of either the static pressure in chamber 164 or the pressure within the pump housing as conducted through tube 152. If during operation, it is desired to flush the seal, this can be done by bleeding the pump pressure down by opening the valve 155. Inasmuch as the pressure from the the housing 112 enters the isolation cylinder 150 through small diameter ports 153 these small diameter ports act as orifices and therefore it is possible to reduce the pressure within the lower chamber 156 to a very low value by opening the valve 155. This reduction of the pressure is great enough to permit the pressure within the housing 112 to force the sealing washer from the sealing surface. If this is not sufficient, of course, the static pressure entering through conduit 165 could be reduced to a minimum. Further, if it were desired, pressure could be bled from the system through the valve 176. If it is desired to increase the pressure on the seals to above the pressure within the housing 112, this is possible by increasing the pressure within the static chamber 164 by increasing the pressure in conduit 165 to a value greatly above that in the housing 112. Another means of increasing the pressure on hydraulic fluid 170 to a pressure above that within the housing 112 is to increase the pressure upon conduit 175 by use of a pump.

Therefore, it may be seen that in normal operation the pressure by which the sealing washers are pressed against the sealing surface is equal to the pressure within the housing 112 but may be adjusted under certain circumstances to be greater or less than this pressure.

Referring now specifically to the FIGS. 7 and 8, there will be seen a second embodiment of the seal. It will be understood that the seal in FIGS. 7 and 8 could be used with the isolation cylinder illustrated in FIG. 2 as well as the isolation cylinder illustrated in FIG. 4. Collar 116 is mounted upon the shaft 114 by set screw 118 and sealed thereto by O-ring 120. The collar 116 has a special radial sealing surface 122 which is specially faced. As before, all of this is conventional and well-known to the art and not specifically discussed here.

End plate 128 and mounting ring 130 are attached to the housing 112 by bolts or studs 132 and are considered part of the housing. Conduit 126 conveys hydraulic pressure to a cylinder area behind sealing washer 124 which is in the form of an annular piston working within an annular cylinder in the housing. This pressure of the hydraulic fluid 170 is conducted through hole 148 extending within the mounting ring 130. The mounting ring 130 forms a fluid-tight connection to the housing 112 by the means of O-ring 134 and O-ring 136 provides a fluid-tight connection between the end plate 128 and the mounting ring 130. As in the prior discussed embodiment, the sealing washer 124 is supported in a single diametrical plane. However, in this instance it is supported by inner diaphragm 146 and outer diaphragm 142. The attachment of these diaphragms 146 and 142 into the annular cylinder wall and into the annular piston is more particularly illustrated in FIGS. 5, 7 and 8. It will be seen that each diaphragm 142 and 136 are thickened at either edge thereof to form a bead. The inside bead of inside diaphragm 146 is held within groove 180 which is formed with the outside portion of cylindrical flange 144 of the end plate 128. Retaining ring 182 is threaded onto the flange 144 so that the bead of the diaphragm 146 is held within the groove 180. The outside bead of the outside diaphragm 142 is held within groove 184 of the inside of the mounting ring 130. It is maintained in place by the clamp ring 186 which is maintained in place between the end plate 128 and the mounting ring 130. The clamp ring 186 has an annular groove 188 which conveys fluid from the hole 148 through a plurality of ports 190 into the cylinder behind the piston acting sealing washer 124.

The sealing washer 124 in this embodiment is a composite assembly including piston portion 192 which contains a notch 194 on its outer edge which receives the inside bead of diaphragm 142. It has a notch 196 on its inside edge which receives the outside bead of the diaphragm 146. The diaphragm 146 is held by clamp ring 198 which is held in place by face ring 200 which is threaded upon the piston portion 192 and at its upper surface clamps the inside bead of the diaphragm 142 into the notch 194. As illustrated, the face ring 200 has a special facing 202 on the radial surface thereof which forms the running fluid-tight seal with the radial surface 122 of collar 116.

It will be apparent that the embodiments shown are only exemplary and that various modifications can be made in construction, materials, and arrangement within the scope of the invention as defined in the appended claims.

What is claimed as invention is:
1. In a system for sealing a rotating shaft to a presurized fluid containing stationary housing including,
 (a) a collar encircling the shaft,
 (b) said collar sealed to the shaft and
 (c) rotated within the shaft,
 (d) said collar having a radially disposed sealing surface on one side of the collar, and
 (e) an annular sealing washer contacting the sealing surface of the collar,
 (f) an annular cylinder formed in said housing,
 (g) said annular sealing washer acting as an annular piston in said annular cylinder;
 the improved means for pressing the sealing washer against the sealing surface of the collar comprising:
  (h) a fluid conduit connected to the annular cylinder in said housing,
  (i) means for applying fluid pressure to said conduit responsive to the fluid pressure within said stationary housing, said means including:
   (j) an isolation cylinder,
   (k) a piston in the isolation cylinder,
   (l) a tube connecting one end of the isolation cylinder to the housing,
   (m) a spring biasing the piston away from the end of the isolation cylinder connected to the housing, and
   (n) the other end of the isolation cylinder connected to said fluid conduit; and
  (o) a valve means for reducing the pressure in the fluid conduit so that there is insufficient pressure to hold the sealing washer against the sealing surface of the collar thus permitting the pressurized fluid within the housing to flush the sealing surface of the collar.

2. In a mechanical seal for sealing a rotating shaft to a pressurized fluid containing stationary housing, said seal including,
 (a) a collar encircling the shaft,
 (b) said collar sealed to the shaft and
 (c) rotated with the shaft,
 (d) a radially disposed sealing surface on one side of the collar,
 (e) an annular sealing washer contacting the sealing surface of the collar,
 (f) said sealing washer sealed to the housing, and
 (g) means for pressing the sealing washer against the sealing surface of the collar to form a fluid-tight joint therebetween; the improved method of operation to reduce leakage by the fluid-tight joint between the sealing washer and collar comprising:
  (h) reducing the force by which the annular sealing washer is pressed against the sealing surface of the collar sufficiently to permit the fluid which is within the housing to force the sealing washer away from the sealing surface,
  (j) thus flushing the fluid-tight joint between the sealing washer and radial sealing surface of the collar with the fluid from the housing to flush away any foreign matter between the sealing washer and radial sealing surface of the collar, and
  (k) re-applying the force by which the sealing washer is pressed against the radial sealing surface of the collar to re-establish the fluid-tight joint therebetween.

References Cited by the Examiner
UNITED STATES PATENTS

| | | | |
|---|---|---|---|
| 2,430,918 | 11/1947 | Curry | 277—73 |
| 2,438,457 | 3/1948 | Schlosser | 277—65 |
| 2,593,939 | 4/1952 | Trist | 277—3 |
| 2,628,112 | 2/1953 | Hebard | 277—68 |
| 2,670,973 | 3/1954 | Ginther et al. | 277—73 |
| 2,672,357 | 3/1954 | Voytech | 277—73 |
| 2,738,996 | 3/1956 | Andersson | 277—3 |
| 3,074,728 | 1/1963 | Freed | 277—3 |
| 3,174,759 | 3/1965 | Schwing et al. | 277—3 |
| 3,194,492 | 7/1965 | Koffinke et al. | 277—3 X |

LAVERNE D. GEIGER, *Primary Examiner.*

SAMUEL ROTHBERG, M. CARY NELSON,
*Examiners.*

H. KLINKSIEK, *Assistant Examiner.*